United States Patent Office.

A. K. EATON, OF PIERMONT, NEW YORK.

Letters Patent No. 94,726, dated September 14, 1869.

---

IMPROVEMENT IN THE MANUFACTURE OF CRUCIBLES.

---

The Schedule referred to in these Letters Patent and making part of the same

---

*To all whom it may concern:*

Be it known that I, A. K. EATON, of Piermont, in the county of Rockland, and State of New York, have invented a new and useful Improvement in the Manufacture of Crucibles and other refractory articles or vessels used in the general practice of chemistry, and especially in treating, melting, smelting, or reducing metallic substances; and I do hereby declare the following to be such a full, clear, and exact description of the same as will enable any one skilled in the arts to which my invention appertains, to make and use the same.

My invention consists in the use of pure alumina, either by itself, or as the main element in such articles of commerce as are to be subjected to a high heat, or used in the practice of chemistry, or in the application of chemistry to the arts.

The object of my invention is more especially to produce better and cheaper crucibles or other refractory articles, to be used in metallurgic operations, and also to produce better and cheaper porcelain articles or ware, to be used in the practice of chemistry, than either of the aforementioned articles or vessels now in use.

The object I accomplish by substituting pure alumina for the expensive black-lead now used in the manufacture of crucibles, and for the silica and the silicate of alumina now used in the manufacture of porcelain and chemical ware, the pure alumina being much cheaper and more refractory than the black-lead used in the manufacture of crucibles, and much more refractory and less subject to chemical action than the silica or silicate of alumina used in the manufacture of the aforesaid chemical ware.

In the practice of my invention, I use pure alumina, in the composition of crucibles, in the place of the black-lead, silicate, or burned clay used in the ordinary process of manufacturing refractory articles of this class.

In the manufacture of melting-pots or crucibles for fusing steel, pure alumina is used in the place of the graphite, or black-lead, and worked as in the ordinary process, with the smallest amount of refractory fire-clay requisite to enable the manufacturer to shape the vessel and give it the necessary strength when burned.

To make the vessel refractory, however, as little clay should be used as possible; but in some cases a mixture of a portion of black-lead with the aforementioned material may be desirable.

Superior porcelain crucibles, evaporating-dishes, &c., may be made also by the use of pure alumina with a little porcelain clay worked together in the ordinary manner.

The vessels composed of this mixture will be strong, very refractory, and very little subject to chemical action.

In the practice of my invention I also use pure alumina, either by itself or mixed with fire-clay, for the purpose of lining black-lead or other crucibles, or as a lining for any receptacle in which iron, steel, or other metal is to be subjected to a high heat.

In the practice of my invention, I also use pure alumina in the manufacture of tiles or bricks, of any shape to be used as a lining, or in the construction of furnaces to be used for smelting, melting, or reducing ores or metals, or for other purposes where very high heat is necessary.

Any pure alumina may of course be used in the practice of this invention, but large quantities of it is produced in the manufacture of carbonate of soda or caustic soda, from cryolite, of which there is from eight to nine thousand tons used in the United States annually, for the purpose above-mentioned. Pure alumina being a side product, for which there is little demand as yet, it can now be had at the rate of about three cents per pound for the hydrated alumina.

Having now described the nature, object, and extent of my invention—

What I claim as new herein, and desire to secure by Letters Patent, is—

Manufacturing crucibles, chemical porcelain ware, bricks, tiles, and other refractory articles which are to be subjected to a high heat in melting, smelting, or reducing ores or metals, or for other purposes, in whole or in part of pure alumina, substantially as described.

A. K. EATON.

Witnesses:
AMOS BROADNAX,
PETER D. KENNY.